United States Patent

Tasaki et al.

[11] 3,897,623
[45] Aug. 5, 1975

[54] METHOD FOR UNDERWATER FRICTIONAL WELDING OF METALLIC MATERIAL

[75] Inventors: Yoshio Tasaki; Noboru Nakayama, both of Nagoya; Hiroshi Kazihara, Kohnan; Mineo Kosaka, Tsushima, all of Japan

[73] Assignee: Agency of Industrial Science & Technology, Tokyo, Japan

[22] Filed: Sept. 16, 1974

[21] Appl. No.: 506,002

[30] Foreign Application Priority Data
Sept. 22, 1973 Japan.............................. 48-107132

[52] U.S. Cl. ..................... 228/112; 156/73.5; 228/2
[51] Int. Cl............................................ B23k 27/00
[58] Field of Search ........ 29/470.3; 228/2; 156/73.5

[56] References Cited
UNITED STATES PATENTS

| | | | |
|---|---|---|---|
| 3,323,203 | 6/1967 | Hollander | 29/470.3 |
| 3,477,115 | 11/1969 | Martin | 29/470.3 |
| 3,535,002 | 10/1970 | Stamm | 29/470.3 |
| 3,615,968 | 10/1971 | Ceresa | 29/470.3 X |
| 3,695,651 | 10/1972 | Stuck | 29/470.3 X |

Primary Examiner—Al Lawrence Smith
Assistant Examiner—Margaret Joyce
Attorney, Agent, or Firm—Oblon, Fisher, Spivak, McClelland & Maier

[57] ABSTRACT

This invention provides a method for underwater frictional welding of metallic articles, which method comprises preparatorily wrapping a heat insulating material such as tape around the periphery at the terminal face of each of the metallic articles subjected to welding, abutting under pressure the terminal faces of the metallic articles against each other and welding the confronting ends of the metallic articles by utilizing the frictional heat produced in the terminal faces by the relative rotary motion and the pressure exerted in the axial direction.

1 Claim, 2 Drawing Figures

METHOD FOR UNDERWATER FRICTIONAL WELDING OF METALLIC MATERIAL

BACKGROUND OF THE INVENTION

This invention relates to a method for underwater frictional welding of metallic articles.

Recently technical research on welding underwater structures has been increasing in consequence of progress in oceanographic developments. As methods available today for welding underwater structures, there can be cited the underwater arc welding method, the underwater plasms welding method, etc. Generally underwater welding is for the most part concerned with cutting and repairing structures. No method has yet been perfected for direct underwater welding of metal parts.

The primary causes for the difficulty of underwater welding are rapid loss of heat to water, oxidation of welded faces, necessary isolation of the area of welding from the enveloping water, etc. which invariably call for special operational provisions. At a greater depth of water, the pressure of water has the adverse effect of impairing the uniformity of temperature distribution at the area of welding, making it difficult to accomplish perfect union of welded metallic articles.

If the frictional welding is carried out underwater, the heat energy generated on the faces of friction is at once liberated into the enveloping water and the temperature in the neighborhood of abutted faces consequently declines to render the welding difficult. If the welding is accomplished somehow or other, the rate at which the welded portion cools off is decidedly higher underwater than in the atmosphere and, therefore, there entails a phenomenon similar to quench hardening effected on the land by immersion in water, with the result that the welded portion and its vicinal parts sustain cracks or assume a highly brittle texture.

An object of this invention is to provide a method which enables the technique of frictional welding usually practiced on land for joining metallic articles by using frictional heat as the heat source to be easily carried out underwater.

Another object of this invention is to provide a method for underwater frictional welding, which permits metallic articles to be joined easily and safely even at a great depth of water and therefore under a high pressure of water without impairing the metallic texture of welded portion or giving rise to cracks.

SUMMARY OF THE INVENTION

To attain the objects described above, the method for underwater frictional welding according to the present invention causes a heat insulating material to be wrapped around the periphery at the terminal face of each of the metallic articles subjected to welding prior to having the terminal faces of the metallic articles abutted against each other and welded by virtue of the frictional heat generated in the confronting terminal faces by the relative rotary motion and the pressure applied in the axial direction.

When the heat insulating material is wrapped around the peripheries at the opposing terminal faces of two metallic articles subjected to welding underwater, a gaseous phase occurs in the fine opening between the metallic articles and the heat insulating material which stops transfer of heat and permits ample accumulation of the heat which is generated near the welded portion of metallic articles. Consequently, even at a great depth of water involving high water pressure, the frictional welding can be accomplished as easily as on land.

Other objects and other characteristic features of the present invention will become apparent from the description to be given in further detail herein below with reference to the accompanying drawings.

DETAILED DESCRIPTION OF THE INVENTION

Figure 1:
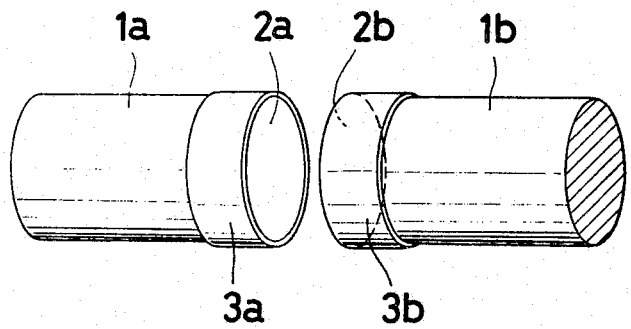
FIG. 1 is a perspective view illustrating metallic articles readied for welding according to the method of this invention.
Figure 2:
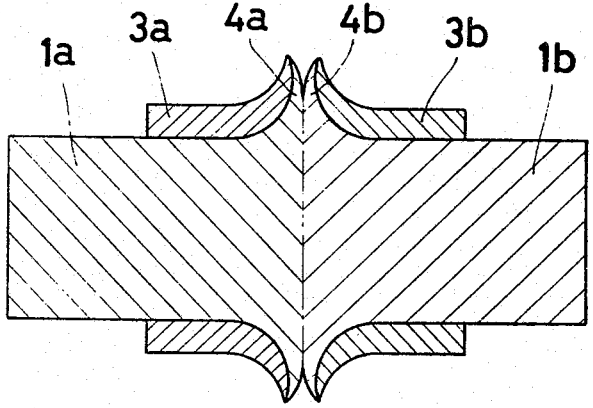
FIG. 2 is a sectional view illustrating the metallic articles which have been welded by the method of this invention.

Before the terminal faces $2a$ and $2b$ of metallic articles $1a$ and $1b$ are abutted against each other and welded by the frictional heat generated in the terminal faces by the relative rotary motion and the pressure exerted in the axial direction, the peripheries at the terminal faces of metallic articles $1a$ and $1b$ are wrapped with heat insulating strips $3a$, $3b$ such as of tape as illustrated in FIG. 1. As the material for the heat insulating strips $3a$, $3b$, there may be used various materials possessed of heat insulating property such as, for example, paper, cloth or a material obtained by spreading an adhesive agent on the surface of such base material as paper or cloth or a material obtained by spreading a silicone type tackifier on glass cloth. Alternatively, the same peripheral protection may be accomplished by preparing a collar made of the same material and possessed of an inside circumference perfectly conforming to the outside circumference of metallic articles subjected to welding and inserting this collar around the terminal portion of each of the metallic articles.

The tape or collar suffices for this purpose when it has a width of 20cm from the terminal face for welding.

After the heat insulating material has been wrapped around the peripheries at the terminal faces of metallic articles subjected to welding, one of the metallic articles $1a$ is rotated around its axis by a rotary device (not illustrated) and, at the same time, the other metallic part $1b$ is fixed by a chuck (not illustrated) and the terminal faces of the two metallic articles are pressed against each other so as to impart relative rotary motion and axial pressure to the terminal faces. Consequently, frictional heat is generated in the joined terminal faces of the metallic articles to elevate the temperature of the point of welding and its vicinal portion. A part of this heat energy is spent in generating steam. The steam thus produced is not wholly released into the enveloping water but gives rise to a gaseous phase in the fine opening between the surface of the metallic articles and the inner surface of the heat insulating material. Consequently, a film of aggregated steam droplets is formed between the surface of metallic articles and the heat insulating material and this film serves to cut off otherwise possible transfer of the frictional heat, enabling the heat energy to be accumulated amply near the spot of welding instead of being dispersed. As a result, the frictional welding can be accomplished under conditions similar to those under which the welding is made in the atmosphere. This effect is manifested conspicuously under a high pressure of water (50 kg/cm$^2$) as well as under a low pressure of water.

As the operation of welding proceeds, the frictional heat comes to cause the abutted faces of the metallic articles to upset (swell out). In the upset portions $4a$, $4b$, limited portions of the heat insulating strips burn while the greater portions thereof swell out along the protruding faces of the upset and remain in a joined state. When the frictional welding is performed underwater as when it is carried out on the land, the welding is completed by bringing the relative rotary motion to a sudden stop and at the same time increasing the axial pressure to a magnitude greater than that during the welding operation after the abutted portions of metallic articles have been fused or transformed to a plastic state. After the termination of welding, the greater part of the heat insulating material remains adhering to the welded portions of metallic articles. The residual heat insulating material functions to lower the rate at which the welded portions cool off, enabling the welded portions to be prevented from enbrittlement due to otherwise possible sudden loss of heat to the enveloping water.

When the underwater frictional welding is carried out without using the aforementioned heat insulating material, the heat energy generated in the abutted faces of metallic articles is consumed to convert part of the enveloping water into steam bubbles, which are dispersed away. As the pressure of water increases under such conditions, the conductivity of heat to the water is improved and the specific heat of water is decreased. Consequently, the heat energy lost to the water increases and the temperature near the welded faces declines, making the welding difficult to accomplish. Since, for the same reason, the rate at which the welded portion cools off after completion of the welding becomes notably larger than when the welding is made in the atmosphere, there ensues a phenomenon similar to quench hardening effected on the land by immersion in water, with the result that cracks are formed in the neighborhood of the welded portion.

As is clear from the foregoing detailed description, however, the heat insulating material wrapped around the peripheries at the terminal faces of metallic articles subjected to welding permits the frictional welding to be carried out as advantageously underwater as on the land, because it prevents the heat energy frictionally generated in the abutted terminal faces from being lost to the enveloping water and also prevents the welded portion from being cooled off suddenly after termination of the welding.

The description given to this point has presumed a case in which metallic articles subjected to welding are in the shape of round bars. It will be self-evident, however, that the present invention is equally applicable to welding a round bar against a metallic plate.

Thus, the present invention can be utilized for joining round bars and for welding studs.

Now, a preferred embodiment of the present invention will be cited herein below. It should be noted that the present invention is not limited to this example.

EXAMPLE

Metallic articles 20mm in diameter at the crank part and 13mm in diameter and 30mm in length at the welding part respectively were made of an annealed material having the composition of 0.32% of C, 0.20% of Si, 0.70% of Mn, 0.014% of P, 0.016% of S, 0.024% of Cr, 0.019% of Ni, 0.03% of Cu and the balance to make 100% of iron.

Pairs each of two of these metallic parts were welded, in their bare form, with the number of revolutions for relative rotary motion fixed at 4000 rpm, the axial pressure at about 4 kg/mm$^2$, the upset pressure at about 8 kg/mm$^2$ and the welding time at 15 seconds under the varying values of water pressure 1 kg/cm$^2$, 4 kg/cm$^2$ and 6 kg/cm$^2$.

The results were as shown in Table 1 below.

Table 1

| Water pressure (kg/cm$^2$) | Amount of upset (mm) | Tensile strength (kg/mm$^2$) | Position of rupture |
|---|---|---|---|
| 1 | 1.4 – 11.6 | 54.8–56.6 | Metallic article proper |
| 4 | 2.0 – 6.1 | 56.0–56.7 | Metallic article proper |
| 6 | 0.5 – 5.2 | 21.3–33.6 | Welded portion |

The numerical values for the columns "amount of upset" and "tensile strength" are respectively the maximum and minimum of the values obtained in total of ten test runs.

As is clear from Table 1, the strength of the welded portion was sharply decreased when the water pressure rose to 6 kg/cm$^2$. Therefore, tapes measuring 19mm in width and 150mm in length and prepared by spreading a heatproof adhesive agent on draftsman's plastic tape available on the market and on polyethylene tetrafluoride and glass cloth were wrapped around the peripheries at terminal faces of the aforementioned metallic articles and the pairs of metallic articles were welded under the same conditions as described above under 6 kg/cm$^2$ of water pressure. The results were as shown in Table 2.

Table 2

| Water pressure (kg/cm$^2$) | Heat insulating material | Amount of upset (mm) | Tensile strength (kg/mm$^2$) | Position of rupture |
|---|---|---|---|---|
| 6 | Plastic tape | 1.0 – 2.2 | 54.3–56.5 | Metallic article proper |
|  | Polyethylene tetrafluoride + Glass cloth | 1.7 – 1.9 | 54.8–56.7 | Metallic article proper |

It is quite plain from Table 2 that the tape wrapped around the peripheries at the terminal faces subjected to welding precluded adverse effects possibly produced by the water pressure at the time of welding. The shape of the upset at the welded portion, which is one of the elements permitting estimation of the results of welding, was well balanced on both sides of the welded interface, the width of heat effect was small and occurrence of flaws such as cracks was not observed at all. The two kinds of tapes described above afforded satisfactory results and showed substantially no discernible difference in performance. From this fact, it may logically be inferred that similarly desirable results will be obtained with thermosetting adhesive tape using glass cloth as the base, thermosetting adhesive tape using paper as the base, insulating tape for electric cables, etc. besides the aforementioned two kinds of tapes.

What is claimed is:

1. A method for underwater frictions welding of metallic articles, which comprises abutting the terminal faces of the metallic articles against each other, causing relative rotary motion between the abutted terminal faces and welding the two metallic articles by utilizing frictional heat consequently caused in the abutted terminal faces because of the relative rotary motion and the axial pressure, which method is characterized by wrapping a heat insulating material around the peripheries at the terminal faces of metallic articles prior to welding.

\* \* \* \* \*